(12) United States Patent
Tsyrina

(10) Patent No.: US 11,854,431 B2
(45) Date of Patent: *Dec. 26, 2023

(54) INTERACTIVE EDUCATION SYSTEM AND METHOD

(71) Applicant: Iryna Tsyrina, Aventura, FL (US)

(72) Inventor: Iryna Tsyrina, Aventura, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/714,397

(22) Filed: Apr. 6, 2022

(65) Prior Publication Data
US 2022/0230552 A1 Jul. 21, 2022

Related U.S. Application Data

(63) Continuation of application No. 15/981,530, filed on May 16, 2018, now Pat. No. 11,328,616, which is a continuation of application No. 14/588,540, filed on Jan. 2, 2015, now abandoned.

(51) Int. Cl.
G09B 5/02 (2006.01)
G06F 3/16 (2006.01)

(52) U.S. Cl.
CPC .............. *G09B 5/02* (2013.01); *G06F 3/167* (2013.01)

(58) Field of Classification Search
CPC ........................................................ G09B 5/02
USPC ........................................................ 434/344
See application file for complete search history.

(56) References Cited

U.S. PATENT DOCUMENTS

| 5,282,651 A * | 2/1994 | Alonso | B42D 25/20 |
| | | | 283/117 |
| 5,940,121 A | 8/1999 | McIntyre et al. | |
| 2004/0002043 A1 * | 1/2004 | Dowrick | G09B 17/00 |
| | | | 434/178 |
| 2005/0283475 A1 | 12/2005 | Beranek et al. | |
| 2013/0149689 A1 | 6/2013 | DeGross | |
| 2013/0236878 A1 | 9/2013 | Saltanov | |
| 2014/0017652 A1 | 1/2014 | Perdreau | |

* cited by examiner

*Primary Examiner* — Robert J Utama
*Assistant Examiner* — Correll T French
(74) *Attorney, Agent, or Firm* — Endurance Law Group PLC; James R. Yee

(57) ABSTRACT

A method of presenting an interactive story including displaying an illustration on a display without a corresponding narrative; receiving a user's input; determining whether the user's input corresponds to at least one word in a hidden narrative associated with the illustration; and displaying the word in the hidden narrative on the display in response to determining that the user's input corresponds to the word.

18 Claims, 16 Drawing Sheets

INTERACTIVE EDUCATION SYSTEM AND METHOD

CROSS REFERENCE TO RELATED APPLICATIONS

This application is a continuation application of U.S. patent application Ser. No. 15/981,530 filed on May 16, 2018, which claims priority to U.S. patent application Ser. No. 14/588,540 filed on Jan. 2, 2015 (now abandoned), the entire disclosures of which is hereby incorporated by reference and relied upon.

BACKGROUND OF THE INVENTION

Field of the Invention

The present invention relates generally to educational systems and methods, and more particularly relates to a method of participating in an interactive story with illustrations and corresponding hidden narratives that are only revealed in response to a user's input, such as typing in and/or audibly reciting words from the hidden narrative.

Background of the Invention

It is well-known that educators encourage reading as providing many substantial benefits to both children and adults, such as, vocabulary expansion, developing language skills, and learning about various topics. In fact, reading is one of the primary methods of educating today. Unfortunately, reading is not highly interactive. On the contrary, it is a rather passive activity where words are observed by the human eye, interpreted by the human brain, and stored away. Creativity is required to write a story, but not much is required to read it. There is very little creativity and interactivity that is required through passive reading. Studies have shown that interactive learning improves critical thinking skills, and develops imagination and logic skills more than passive learning. Interactive learning also helps with retention and memory and is sometimes considered more entertaining and engaging than passive learning techniques.

To increase the level of interactivity and engagement in books, some eBooks have incorporated features, such as 3-D animated graphic illustrations, and options to click on illustrated characters or objects to receive an audible message from the character or other additional information. However, these features are actually not much more interactive than reading, merely requiring clicking and viewing. These features do not require a higher level of involvement, such as requiring the reader to participate in the storytelling process, to fully engage the attention of the reader, requiring the reader to pay close attention to details of the illustration and allowing the reader to participate in the creative storytelling process.

Therefore, a need exists to overcome the problems with the prior art as discussed above.

BRIEF SUMMARY OF THE INVENTION

The invention provides an interactive educational system and method that overcomes the hereinafore-mentioned disadvantages of the heretofore-known devices and methods of this general type.

With the foregoing and other objects in view, there is provided, in accordance with the invention, a method of associating a multi-word narrative with an illustration, the method including displaying an illustration without a corresponding narrative; receiving a user's input; determining whether the user's input corresponds to at least one word in a hidden narrative associated with the illustration; and displaying the word in the hidden narrative in response to determining that the user's input corresponds to the at least one word.

In accordance with another feature of the present invention, the user's input includes an utterance of the word.

In accordance with a further feature of the present invention, the hidden narrative describes only viewable features of the illustration.

In accordance with a further feature of the present invention, the illustration is formed as a single still image.

In accordance with yet another feature of the present invention, the illustration is formed as a sequence of still images.

In accordance with another feature of the present invention, the illustration is formed as a video.

In accordance with a further feature of the present invention, displaying the illustration further comprises displaying the illustration on a display for a predetermined time period.

In accordance with the present invention, a method of learning includes viewing an illustration on a display without a corresponding narrative; and determining a hidden narrative associated with the illustration by inputting at least one word from the hidden narrative such that the word becomes viewable on the display in response to inputting the word.

In accordance with the present invention, an education method includes providing an illustration configured to be viewable by a user without a corresponding narrative; and creating a hidden narrative describing only viewable features of the illustration, where each of a plurality of words in the hidden narrative is configured to become viewable in response to a user's input of said word.

In accordance with the present invention, a system for presenting an interactive story is provided, the system including a display; a speech recognition module configured to receive at least a portion of an utterance, analyze the portion of the utterance, and identify a word corresponding to the portion of the utterance; a processing device communicatively coupled to the display and the speech recognition module. The processing device is configured to execute computer instructions, the computer instructions including instructions for displaying an illustration on the display without a corresponding narrative; and displaying on the display at least one word of a hidden narrative associated with the illustration in response to the speech recognition module identifying the word as corresponding to a user's utterance.

Although the invention is illustrated and described herein as embodied in an interactive story system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "'an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the display. The terms "program," "software application," and the like as used herein, are defined as a sequence of instructions designed for execution on a computer system. A "program," "computer program," "software application," or "computer instructions" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE SEVERAL VIEWS OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION OF THE INVENTION

Figure 1:
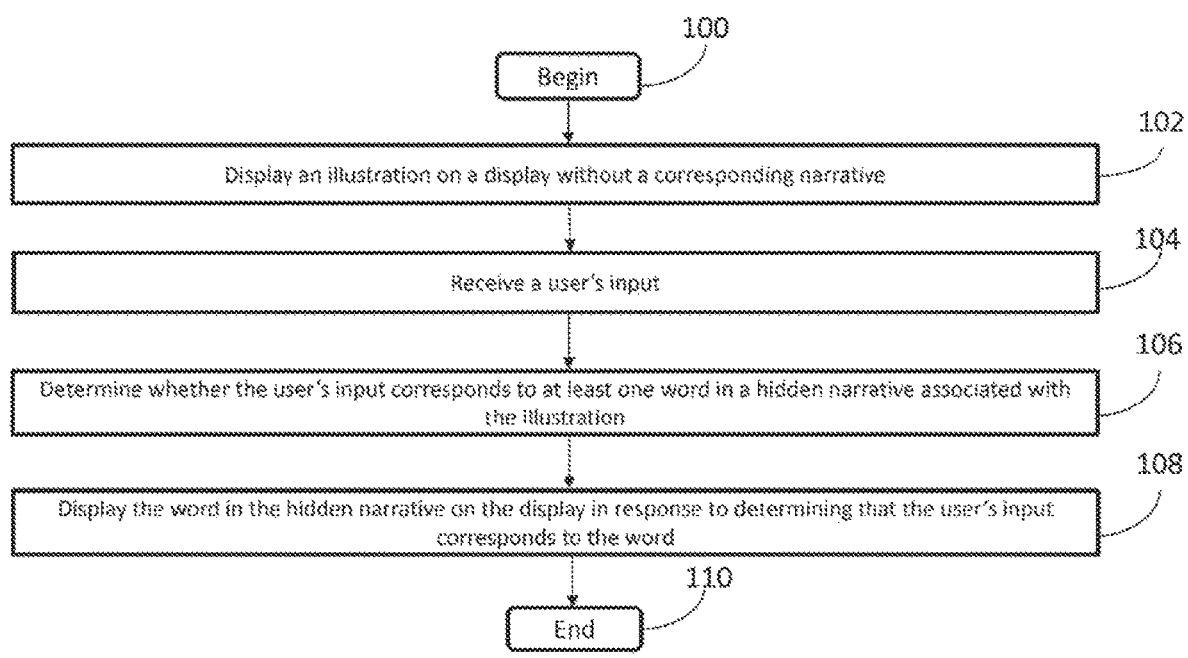
FIG. 1 is a process flow chart representing an exemplary method of presenting an interactive story, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient method of presenting an interactive story that requires a user to participate in the storytelling process. Embodiments of the invention provide for displaying an illustration to the user with a hidden narrative and allowing the user to make observations of objects in the illustration and inferences from the illustration, such as emotion of the characters, to unveil words in the hidden narrative. In addition, embodiments of the invention provide for a user input module, such as a speech recognition module that is able to determine whether audible utterances by the user corresponds to one or more hidden words in the hidden narrative, which results in unveiling of the hidden word(s). In another embodiment, the user input module is configured to receive textual user input through typing, rather than audible user input. The inventive process develops attention skills, especially in children, by requiring them to pay close attention to objects and allows users to develop a story through detailed observations of the illustration. The inventive process also develops writing skills, grammar, sentence building, and storytelling skills and can be particularly useful as a language learning tool.

Referring now to FIG. 1, one embodiment of the present invention is shown in a process flow chart. FIG. 1 shows several advantageous features of the present invention, but, as will be described below, the invention can be provided in several shapes, sizes, combinations of features and components, varying numbers and functions of the components, and can be performed in varying sequences and with different intermediary steps. The first example of a process for presenting an interactive story, as shown in FIG. 1, will be described in conjunction with FIGS. 2-7, which depict screenshots from an exemplary software application that may implement the inventive process. As used herein, the term "interactive" is defined as involving input from a user. The process flow starts at step 100 and moves directly to step 102 where an illustration is displayed on a display without a corresponding narrative. As used herein, the term "illus-tration" is defined as a visualization or a depiction, such as a drawing, sketch, painting, photograph, cartoon, video, computer graphic, or other kind of visual representation, whether still or dynamic, of things seen, remembered, or imagined, including a graphic depiction of words, text, and punctuation marks. In one embodiment, the illustration is formed as a single still image. As used herein, the term "still image" is intended to indicate any static visual representation, such as a sketch, photograph, drawing, painting, or the like. In another embodiment, the illustration is formed as a sequence of still images, such as, for example, a cartoon or other animation. In yet another embodiment, the illustration is formed as a video, such as, for example, a short video clip or television clip that can be used to prompt the user to recite the corresponding narrative by making observations of and inferences from the video or television clip.

In a preferred embodiment, the illustration is associated with a descriptive narrative; however, the narrative is not displayed initially to a user, which provides the user with a chance to create the story himself, using the illustration as a guide. As used herein, the term "display" is defined as an electronic device for the visual presentation of data. In one embodiment, the display is a computer monitor. In another embodiment, the display is a television monitor. In yet another embodiment, the display is formed as a touchscreen of an electronic mobile device, such as a smart phone, a computer tablet, an e-Reader, or the like. As used herein, the term "corresponding narrative" is intended to indicate a narrative that is associated with and/or describes the illustration.

Figure 2:
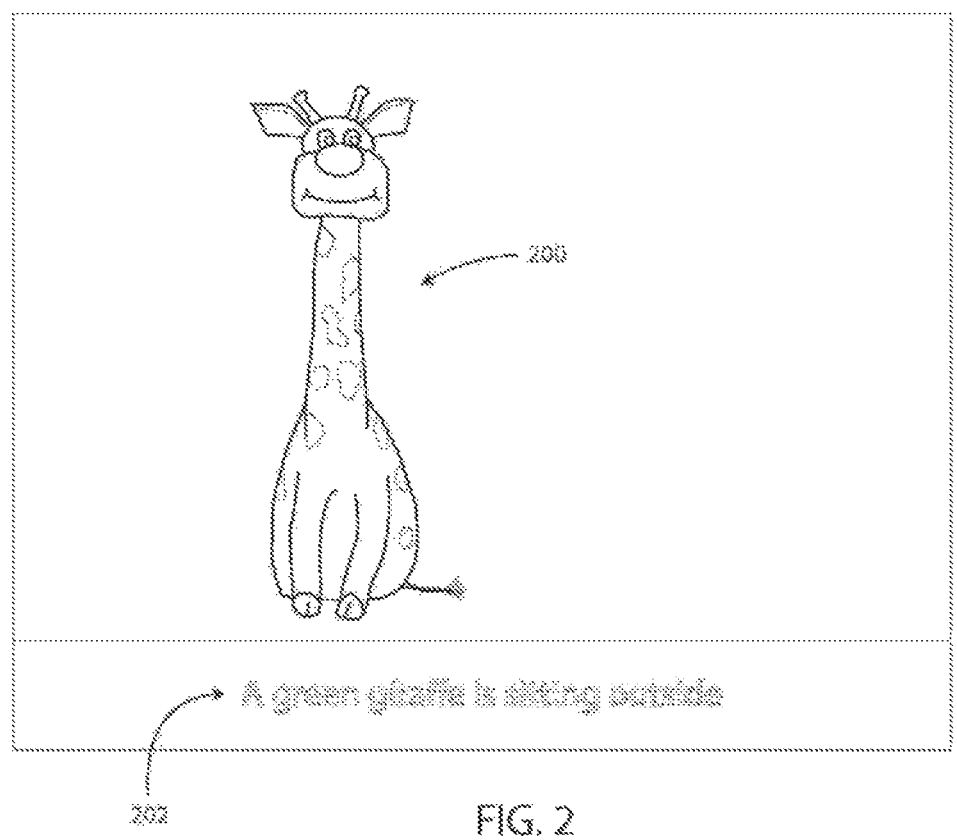
FIG. 2 is a screenshot of an exemplary software application at least partially implementing the inventive process, the screenshot depicting an illustration with a hidden narrative presented on a display of a computing device in accordance with the present invention.

Referring to FIG. 2, an exemplary illustration 200 is presented without a corresponding narrative. It is noted that dotted line text appears below the illustration 200, representing a hidden narrative that is not yet revealed to the user via the display. The exemplary illustration 200 is formed as a green giraffe that is sitting. In one embodiment, the illustration is displayed on the display only for a limited, predetermined time period so as to require the user to make observations quickly and through recollection. This option may be available in a medium or a hard setting to further challenge the user and improve the user's memory. In one embodiment, a software application implementing one or more of the features described herein, can also include an easy, medium, and a hard setting that allows the user to tailor the difficulty to his desired level. In one embodiment, the predetermined time period is less than or equal to approximately 60 seconds. In another embodiment, the predetermined time period is approximately 30 seconds. In yet another embodiment, the predetermined time period is approximately 15 seconds. In further embodiments, the predetermined time period is outside of these ranges. In another embodiment, the hard setting has a longer predetermined time period than the medium and easy settings. In a further embodiment, the user can select the predetermined time period. In yet a further embodiment, the time period is determined at random by the software application.

In step 104, the user's input is received. The user's input can be received through, for example, a user input interface, such as a keyboard, a mouse, or a touchscreen, or the user's input can be received through, for example, an audio input, such as a microphone. In one embodiment, the display and user input interface (and/or audio input) can be communicatively coupled to an electronic device, such as a computer tablet, a smart phone, a laptop, a personal computer, and the like, on which the software application can run/operate. In another embodiment, the display and user input interface (and/or audio input) can be communicatively coupled to an electronic device dedicated to presenting stories/books in accordance with the present invention, such as, for example, an e-Reader specifically dedicated to allowing users to read and interact with hidden text books of the present invention. As used herein, the term "input" is intended to indicate any information and/or data from the user that is put in or enters an electronic device for processing. In one embodiment, the input includes typed text/characters that are entered by the user through, for example, a keyboard or a touchscreen. In another embodiment, the input includes an utterance of at least a portion of a word by the user, which is received via a microphone. As used herein, the term "utterance" is defined as a vocal expression. In yet another embodiment, the present invention can include a speech recognition module configured to receive at least a portion of the utterance, analyze the portion of the utterance, and identify a word corresponding to the portion of the utterance. In this manner, the speech recognition module can assist in converting analog audio signals from the user to digital information that can be processed by a processor of the electronic device and used to implement one or more of the features described herein on the electronic device. In further embodiments, the input can include other types of user communication methods.

In step 106, the electronic device determines whether the user's input corresponds to at least one word in the hidden narrative associated with the illustration. As used herein, the term "corresponds" is defined as: to be substantially similar or equivalent, or to match. In one embodiment, the speech recognition module determines whether the user's utterance corresponds to a spoken word and the software application further determines whether the spoken word corresponds to a hidden word in the hidden narrative. In another embodiment, the software application determines whether the user's typed textual input corresponds to a hidden word in the hidden narrative. As used herein, the term "narrative" is defined as including a spoken, written, printed, or other textual account of related events, description, definitions, translations, and/or facts, real or imagined, and punctuation marks. As used herein, the term "hidden narrative" is defined as a narrative that is hidden from display with its corresponding illustration, but can be displayable with its corresponding illustration in response to the occurrence of one or more user inputs. In one embodiment, the narrative can include a portion of a fictional story, such as a children's story or a novel. In another embodiment, the narrative can include a portion of a description of a factual or historical event or a scientific or mathematical understanding. In yet another embodiment, the narrative can be formed as a portion of a story presented in a language other than a primary language of the user, i.e. a foreign language. Accordingly, embodiments of the present invention can be used as an interactive learning tool for learning foreign languages. In a further embodiment, the narrative includes one or more steps in a medical procedure. In yet another embodiment, the narrative includes a definition and the illustration is a graphical representation of the word being defined by the narrative. This can be considered a novel flash card embodiment of the present invention. Preferably, the narrative includes observations, descriptions, and inferences that can be made from the illustration. FIG. 2 illustrates an exemplary embodiment of a hidden narrative 202 corresponding to the illustration 200. For illustrative purposes, in FIG. 2-7, the hidden narrative 202 is presented in a dotted line format when the hidden narrative 202 is hidden, i.e. not displayed, and is presented in normal black text when portions of the hidden narrative 202 are revealed.

Figure 3:
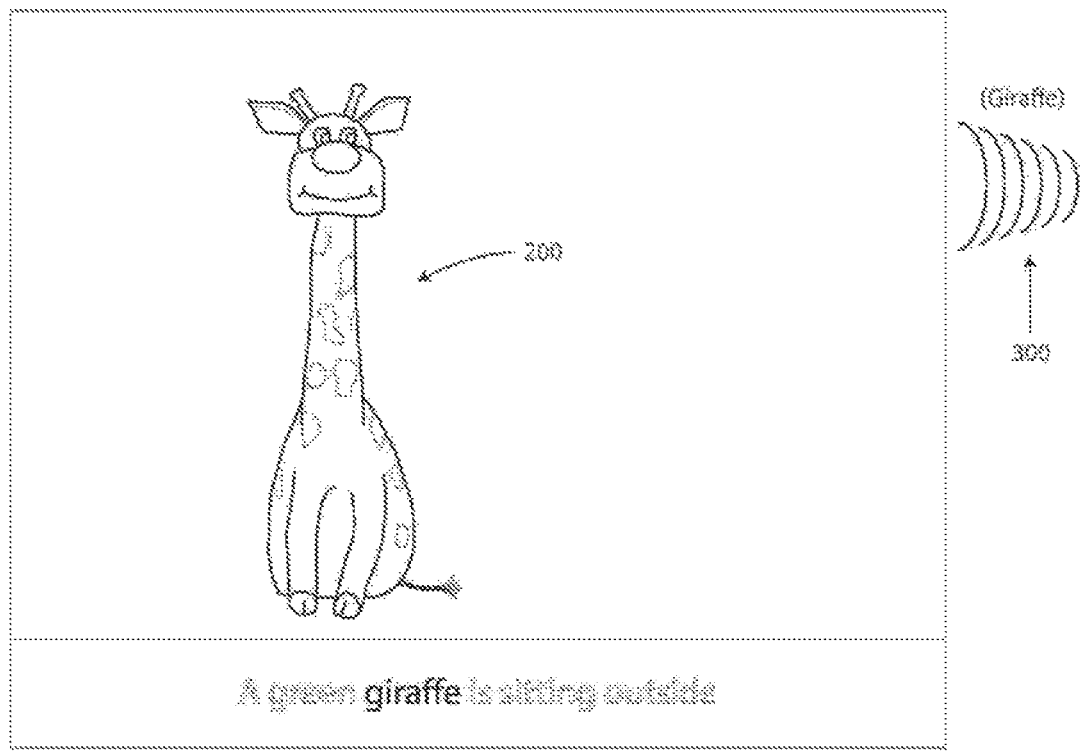
FIG. 3 is a screenshot of the exemplary software application of FIG. 2 depicting a revealed word corresponding to an utterance/input by a user in accordance with the present invention.

In step 108, the word in the hidden narrative is displayed on the display in response to determining that the user's input corresponds to the word. FIG. 3 presents a user interface where, in response to the utterance 300 of the word "giraffe," the text GIRAFFE is revealed/displayed beneath the illustration 200. In some embodiments, the exact wording is not required to reveal a word in the hidden narrative. For example, if the root word (e.g. sit) is uttered/spoken, typed, or otherwise input by the user, the corresponding full word (e.g. sitting) in the hidden narrative may be revealed. In a foreign language learning embodiment, as the user makes observations of the illustration, via utterances or typed input, in the user's native language, the hidden narrative is in a foreign language. For example, in response to the user's utterance of "giraffe," which is an English word, the hidden narrative is revealed on the display in the foreign language equivalent, such as "jirafa," which is the Spanish word for "giraffe." In a further embodiment, in response to the hidden text being revealed, the software application also causes a computerized audio playback of the foreign language word(s) as they are revealed, so that the user may hear the proper pronunciation and intonations and learn sentence building and spelling in the foreign language.

In one embodiment, punctuation is automatically revealed with the illustration 200. In another embodiment, punctuation is revealed only when the word that immediately precedes or follows the punctuation is revealed. For example, the sentence "A green giraffe is sitting outside" ends with a period. Accordingly, the period at the end of the sentence would only be revealed as a result of the word "outside" being revealed, as the word "outside" immediately precedes the period. In yet another embodiment, punctuation is only revealed when the punctuation is uttered or typed in. For example, the period at the end of the sentence "A green giraffe is sitting outside" would only be revealed when the user utters or types in the word "period." As another example, commas would only be revealed when the user utters or types in the word "comma." In yet another embodiment, punctuation is only revealed when the punctuation is uttered or typed with the word that immediately precedes the punctuation. For example, in one embodiment, the period at the end of the sentence "A green giraffe is sitting outside" is revealed as a result of the user uttering or typing in the words "outside period." In another embodiment, commas are revealed, one at a time, when the user utters or types in the word "comma" with the word that immediately precedes the comma. For example, the hidden text is "A bear, Teddy, loves ice cream." Punctuation is revealed as a result of the user uttering or typing in the words "A bear comma Teddy comma loves ice cream period." Accordingly, users can learn proper punctuation. In yet another embodiment, all punctuation is revealed as a result of the user uttering or typing in the word for the punctuation. For example, all commas in the hidden text are revealed as a result of the user uttering or typing in the word "comma."

Figure 4:
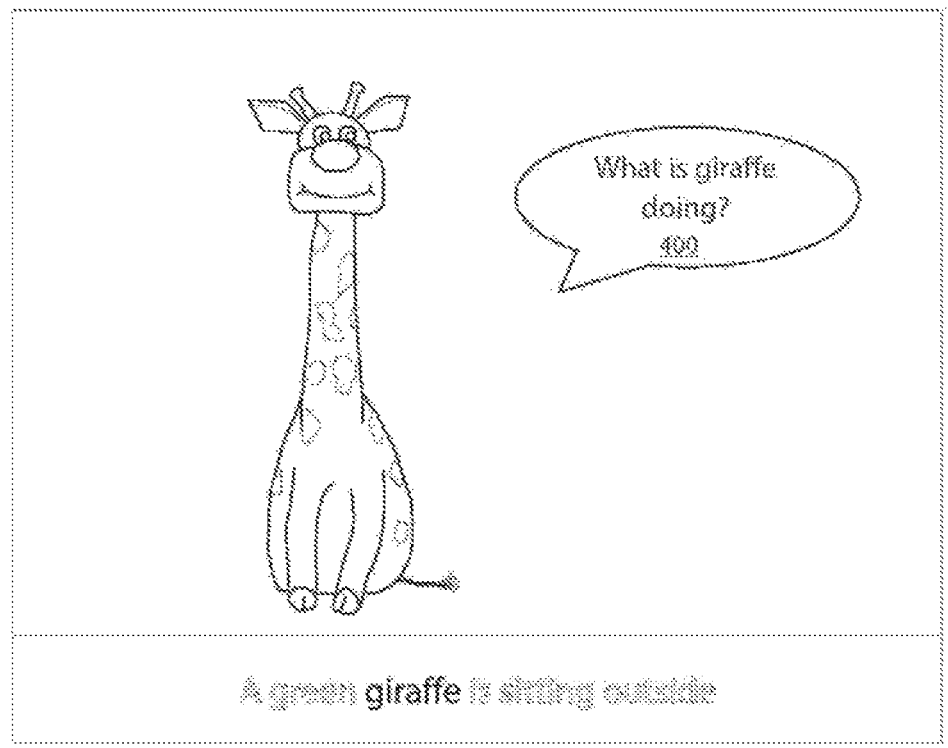
FIG. 4 is a screenshot of the exemplary software application of FIG. 2 depicting a visual clue including a leading question displayed to the user in accordance with the present invention.

In additional embodiments, the software application can include clues to assist the user with formulating the story from the illustration. In one embodiment, clicking on an object reveals one or more hidden words corresponding to the selected object. In another embodiment, leading questions can be displayed to assist the user, such as, what is the bear eating? Or, how many times should you push the patient's chest? FIG. 4 shows an exemplary leading question clue 400, prompting the user to answer as to what the giraffe is doing. The leading question clue 400 is in the form of a printed/visual question enclosed in a speech bubble displayed on the display proximate the illustration. In another embodiment, the leading question clue 400 can include a computerized digital signal from the electronic device simulating an audible vocalized question.

Figure 5:
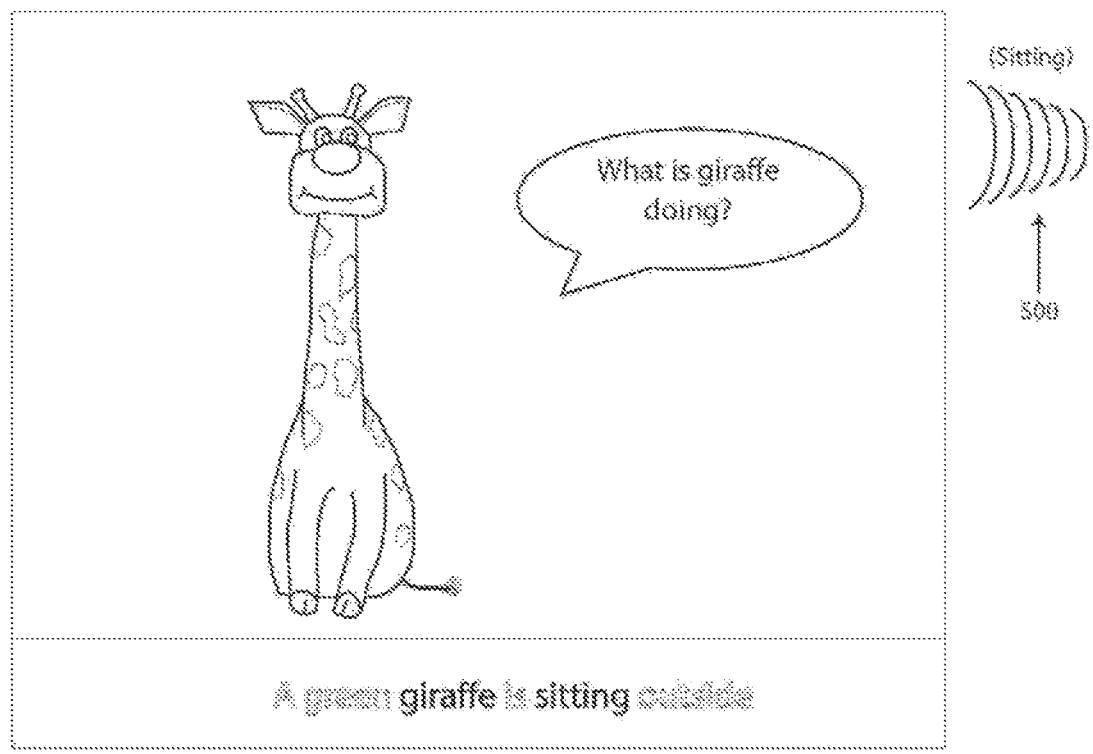
FIG. 5 is a screenshot of the exemplary software application of FIG. 2 depicting a revealed word corresponding to an utterance/input by the user in response to the visual clue in FIG. 4 in accordance with the present invention.
Figure 6:
FIG. 6 is a screenshot of the exemplary software application of FIG. 2 depicting a revealed word corresponding to a software feature that reveals verbs in accordance with the present invention.

FIG. 5 illustrates that, in response to the user's utterance 500 of the word "sitting." the text SITTING is revealed/displayed within the hidden narrative. In yet another embodiment, the clue can be an option to reveal particular words by classification, e.g. by noun, pronoun, adjective, verb, adverb, conjunction, proposition, interjection, punctuation, and the like. FIG. 6 illustrates an option where the verbs 600 are revealed from the hidden narrative. In a further embodiment, the clue can include an underline of each unrevealed hidden word in the hidden narrative such that the user may observe the length and the number of words remaining in the hidden narrative.

Figure 7:
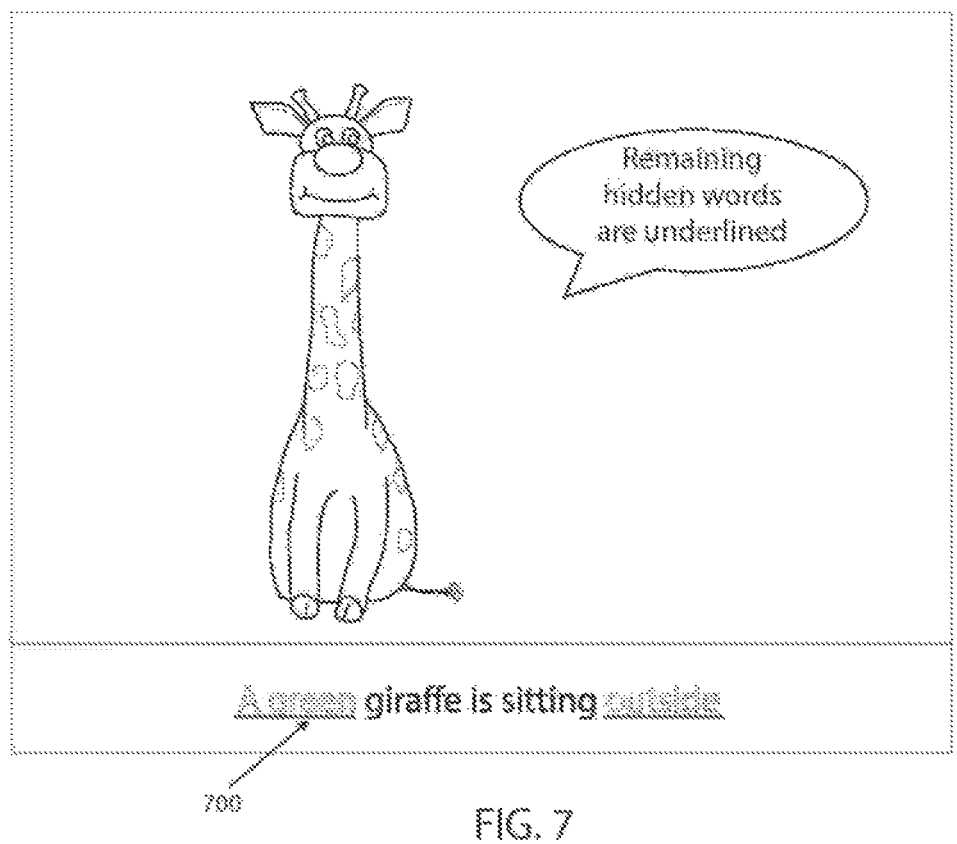
FIG. 7 is a screenshot of the exemplary software application of FIG. 2 depicting a visual clue including an underline of hidden words in accordance with the present invention.

FIG. 7 illustrates an option where the remaining unrevealed hidden words are underlined 700. In yet a further embodiment, the clue can include a distinct underline of each letter of each unrevealed hidden word in the hidden narrative such that the user may observe how many letters are in each unrevealed hidden word. In another embodiment, if the user utters, types, or otherwise inputs a synonym for a hidden word in the hidden narrative, a message is communicated, such as. "'very close" or "'almost, the word we're looking for begins with an S," or some other encouragement that the user is on the right track. In yet another embodiment, if the user utters, types, or otherwise inputs a synonym for a hidden word, the hidden word is revealed and a message is communicated, such as, "close enough," or "'these words are synonyms." In yet a further embodiment, the clue can be in the form of highlighting or pointing arrows towards objects or other visual aspects of the illustration that have not been observed and uttered by the user yet. In one embodiment, the user can be presented with a list of clue types and the user can select which clue type to activate. In another embodiment, the clues can be provided at timed intervals controlled by the software application. In yet another embodiment, the user can select a hard, medium, or easy setting, where, for example, no clues are provided in the hard setting, some clues are provided in the medium setting, and all available clues are provided in the easy setting. In a preferred embodiment, the hidden narrative describes only viewable features of the illustration, not additional story elements that cannot be observed, inferred or otherwise discerned from the illustration. As used herein, the term "viewable features" is intended to indicate features that can be observed, inferred, or otherwise discerned from the visual depiction provided by the illustration. For example, the exemplary illustration 200 (FIG. 2) shows a green giraffe sitting outside. Accordingly, any corresponding hidden narrative would not include any discussion of a house, a tree, or any other additional story elements not observable or inferable from the illustration.

In one embodiment, for grammar learning purposes, the illustration will include the text as a non-hidden narrative viewable on the display, while the punctuation is hidden. In another embodiment, all the text is presented in lower case so that the user is prompted to reveal the grammatically proper text format as a result of the user uttering or typing in the punctuation following the word that immediately precedes it. As an example, the illustration is displayed on the display to include the non-hidden text: "It was a nice and sunny day mama bear was making pancakes as little bear was walking down the stairs." The grammatically proper text and punctuation is revealed as a result of the user uttering or typing in the words of the text, including the words for the punctuation. For example, as a result of the user uttering or typing in the following: "It was a nice and sunny day period," a period will be revealed between the words "day" and "mama," and the letter "m" in "mama" will change on the display to a capital letter "M" because of the grammatical rule that the first letter in a new sentence is always capitalized. Further, as a result of the user uttering or typing in the following: "mama bear was making pancakes comma as little bear was walking down the stairs period," the comma and period are revealed on the display in the proper location, along with the text. Accordingly, users can learn proper grammar and punctuation.

In one embodiment, there may be a limited, predetermined number of attempts to reveal punctuation, after which the software application will prevent additional attempts, and/or present a score determined by the amount of attempts and the number of correct punctuation marks revealed. In another embodiment, the predetermined number of attempts depends on the level of complexity-selected for a particular narrative, story, or session. For example, the hidden text may include ten commas, with fifteen total attempts allowed. In one exemplary embodiment, the illustration includes as viewable on the display the non-hidden text: "Marvin as he was known to those around him." If the software application allows only a single attempt and the user utters or types in: "Marvin as he was known comma to those around him" the user would receive a failing grade or score and not be allowed any more attempts, because the proper grammar and punctuation is: "Marvin, as he was known to those around him." with the comma immediately following the word "Marvin." As another example, an illustration including a 200 character narrative may include 20 commas, with the user taking 30 attempts to reveal all 20 commas (or other punctuation). After the number of attempts is depleted, the user may receive a score or a grade, such as 60% or a C, for example, where the score is determined by the number of attempts taken and/or the number of revealed punctuation marks and/or the amount of time required to reveal all the punctuation marks. The process ends at step 110.

Figure 8:
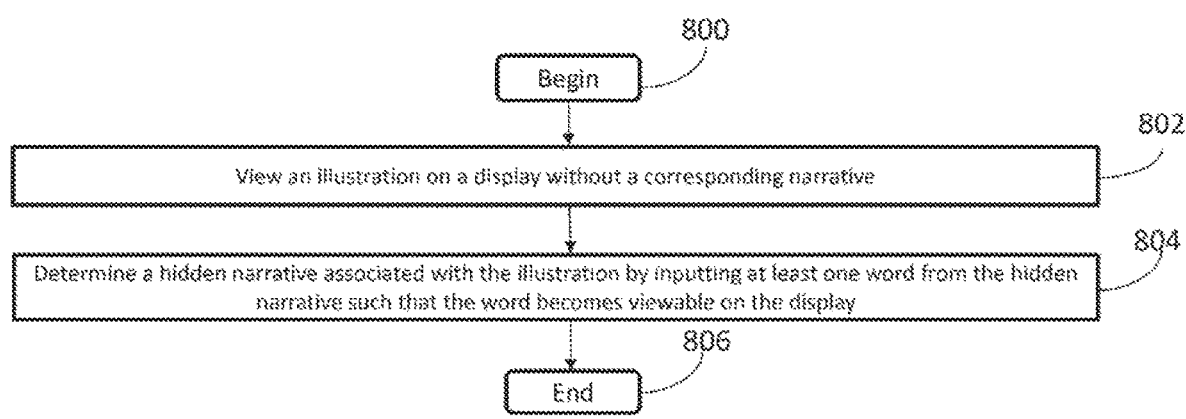
FIG. 8 is another process flow chart representing an exemplary method of learning, in accordance with an embodiment of the present invention.

Referring to FIG. 8, a process flow chart is presented for an exemplary method of using the software application, or of learning, in accordance with the present invention. The process begins at step 800 and immediately proceeds to step 802, where the user views the illustration on the display without the corresponding narrative. In step 804, the user determines the hidden narrative associated with the illustration by inputting at least one word from the hidden narrative such that the word becomes viewable on the display. As discussed above, the user makes this determination by observing the illustration and making inferences from the illustration and uttering, typing, or otherwise inputting his observations in the electronic device operating the software application. After the user determines/reveals the hidden narrative for the illustration by inputting each of the words in the hidden narrative, the user can scroll, tab, or swipe to the next page, where a second illustration is displayed without its corresponding narrative, and the process may repeat until the hidden narrative for the last page is determined. In this manner, the user can participate in the entire storytelling process from page to page by revealing the hidden narrative for each subsequent illustration. In one embodiment, the present invention can include a timed aspect, where the time period to complete the story is recorded so that the user can try to improve his time in subsequent runs, or compare his time to other users times. The process ends at step 806.

Figure 9:
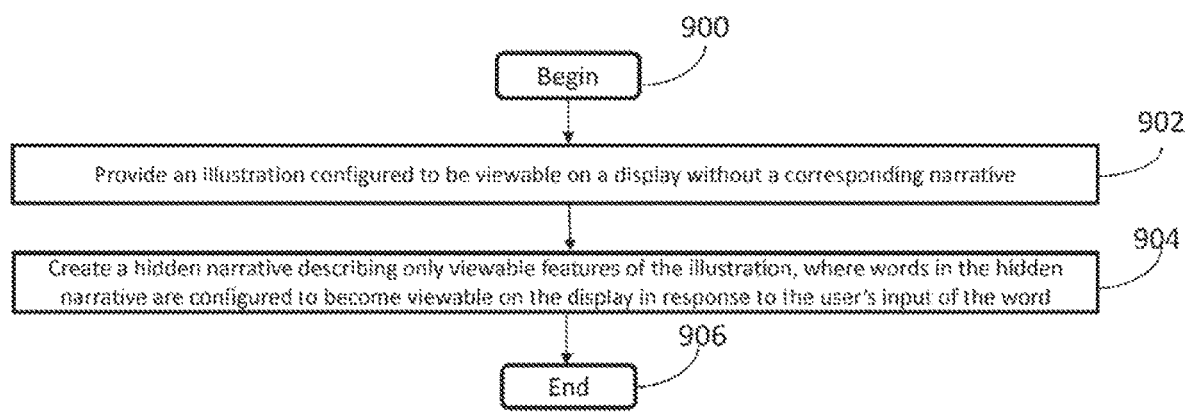
FIG. 9 is yet another process flow chart representing an exemplary method of storytelling, in accordance with an embodiment of the present invention.

Referring to FIG. 9, a process flow chart is presented for an exemplary method of storytelling, in accordance with the present invention. As used herein, the term "'storytelling" is intended to mean conveying related events, description, and/or facts, real or imagined, in words and/or still or dynamic images. The process begins at step 900 and immediately proceeds to step 902, where an author provides an illustration configured to be viewable on a display without a corresponding narrative. In one embodiment, the author provides the illustration by obtaining the illustration from an artist that creates the illustration. In another embodiment, the author creates the illustration himself through, for example, sketching, drawing, painting, using computer drawing tools, and the like. In step 904, the author creates a hidden narrative describing only viewable features of the illustration. Viewable features of the illustration can include expressly observable subjects or characteristics, such as a subject's name, color, activity, clothing, location, and the like. Viewable features of the illustration may also include observations that can be inferred or deduced from the illustration, such as an emotion of a character, where the illustration includes a smile, or a movement of the character, where movement lines are included in the illustration. Each of a plurality of words in the hidden narrative is configured to become viewable on the display in response to a user's input of said word. In one embodiment, the author creates the hidden narrative by writing or typing the hidden narrative describing detailed observable features of the illustration. In another embodiment, the author creates the hidden narrative first and then, subsequently, the illustration is created or provided to correspond to the hidden narrative such that each of the plurality of words in the hidden narrative is observable from the illustration. In some embodiments, the illustrations are fairly simplistic, such as the sitting green giraffe depicted in FIGS. 2-7. These fairly simplistic illustrations may be included in, for example, younger children's hidden narrative stories, or for beginning foreign language students. In other embodiments, the illustrations can be much more complex and involved, including multiple subjects and objects with very detailed scenes. These more complex illustrations can be included in, for example, more adult hidden narrative stories, or for advanced foreign language students. Creating stories from only viewable features of the illustrations is a novel and inventive new method of storytelling. The process ends at step 906.

It is understood that the process steps described in reference to FIGS. 1, 8, and 9 are exemplary and are not intended to limit the present invention. Other embodiments may be implemented in a different sequence, some steps may be omitted for brevity, and some steps may occur concurrently with one another.

Figure 10:
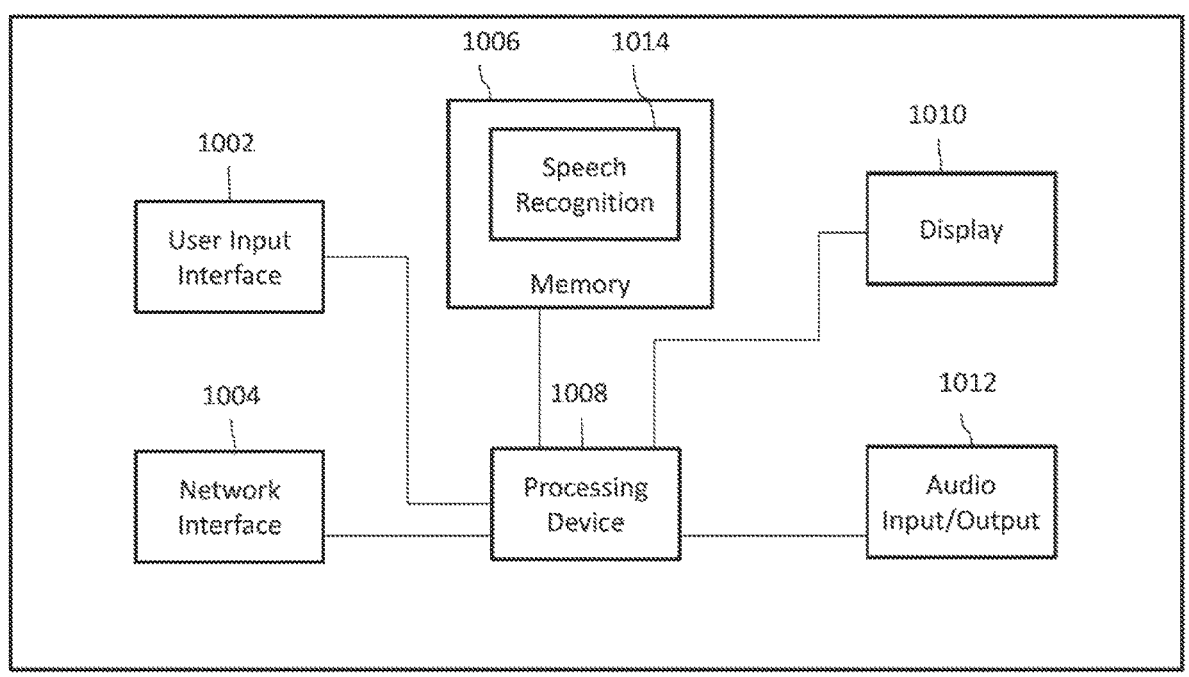
FIG. 10 is a block diagram of an exemplary electronic device, in accordance with an embodiment of the present invention.

Referring to FIG. 10, an exemplary electronic device 1000 is illustrated in a block diagram. The exemplary electronic device 1000 includes a user input interface 1002, a network interface 1004, memory 1006, a processing device 1008, a display 1010, an audio input/output 1012, and a speech recognition module 1014. In one embodiment, the electronic device 1000 is a mobile electronic device, such as a computer tablet, a smart phone, a laptop, a dedicated e-Reader, or the like. In another embodiment, the electronic device 1000 is a personal computer.

The user input interface 1002 functions to provide a user a method of providing input to the electronic device 1000. The user input interface 1002 may also facilitate interaction between the user and the device 1000. The user input interface 1002 may be a keypad providing a variety of user input operations. For example, the keypad may include alphanumeric keys for allowing entry of alphanumeric information (e.g. telephone numbers, contact information, text, etc.). The user input interface 1002 may include special function keys (e.g. a camera shutter button, volume control buttons, back buttons, home button, etc.), navigation and select keys, a pointing device, and the like. Keys, buttons, and/or keypads may be implemented as a touchscreen associated with the display 1010. The touchscreen may also provide output or feedback to the user, such as haptic feedback or orientation adjustments of the keypad according to sensor signals received by motion detectors, such as an accelerometer, located within the device 1000.

The network interfaces 1004 may include one or more network interface cards (NIC) or a network controller. In some embodiments, the network interface 1004 may include a personal area network (PAN) interface. The PAN interface may provide the capability for the electronic device 1000 to network using a short-range communication protocol, for example, a Bluetooth communication protocol. The PAN interface may permit one electronic device 1000 to connect wirelessly to another electronic device 1000 via a peer-to-peer connection.

The network interfaces 1004 may also include a local area network (LAN) interface. The LAN interface may be, for example, an interface to a wireless LAN, such as a Wi-Fi network. The range of the LAN interface may generally exceed the range available via the PAN interface. Typically, a connection between two electronic devices via the LAN interface may involve communication through a network router or other intermediary device.

Additionally, the network interfaces 1004 may include the capability to connect to a wide area network (WAN) via a WAN interface. The WAN interface may permit a connection to a cellular mobile communications network, or the Internet. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

The electronic device 1000 may also include a near field communication (NFC) interface. The NFC interface may allow for extremely close range communication at relatively low data rates (e.g., 424 kb/s). The NFC interface may take place via magnetic field induction, allowing the NFC interface to communicate with other NFC interfaces located on other electronic devices 1000 or to retrieve information from tags having radio frequency identification (RFID) circuitry. The NFC interface may enable initiation and/or facilitation of data transfer from one electronic device 1000 to another electronic device 1000 with an extremely close range (e.g. 4 centimeters).

Memory 1006 associated with the device 1000 may be, for example, one or more buffer, a flash memory, or non-volatile memory, such as random access memory (RAM). The electronic device 1000 may also include non-volatile storage. The non-volatile storage may represent any suitable storage medium, such as a hard disk drive or non-volatile memory, such as flash memory. In one embodiment, software instructions associated with the speech recognition module 1014 are stored in non-volatile memory and are executable by the processing device 1008. In a further embodiment, the speech recognition module 1014 is configured to receive at least a portion of a user's utterance, analyze the portion of the utterance, and identify a word corresponding to the portion of the utterance.

The processing device 1008 can be, for example, a central processing unit (CPU), a microcontroller, or a microprocessing device, including a "general purpose" microprocessing device or a special purpose microprocessing device. The processing device 1008 executes code stored in memory 1006 in order to carry out operation/instructions of the electronic device 1000. The processing device 1008 may provide the processing capability to execute an operating system, run various applications, and provide processing for one or more of the techniques described herein.

The display 1010 displays information to the user such as an operating state, time, telephone numbers, various menus, application icons, pull-down menus, and the like. The display 1010 may be used to present various images, text, graphics, or videos to the user, such as photographs, mobile television content, Internet webpages, and mobile application interfaces. In a preferred embodiment, the display 1010 is used to present illustrations and any revealed words from the hidden narrative in accordance with the present invention. The display 1010 may be any type of suitable display, such as a liquid-crystal display (LCD), a plasma display, a light-emitting diode (LED) display, or the like.

The electronic device 1000 may include audio input and output structures 1012, such as a microphone for receiving audio signals, e.g. utterances, from the user and/or a speaker for outputting audio data, such as audio alerts, songs, ringtones, video tracks, audio playback of the revealed text, for example, for learning pronunciation in foreign language learning embodiments of the present invention, voice data received by the electronic device 1000 over a cellular network, and the like. The electronic device 1000 may also include an audio port for connection to peripheral audio input and output structures, such as a headset, or peripheral speakers or microphones.

Figure 11:
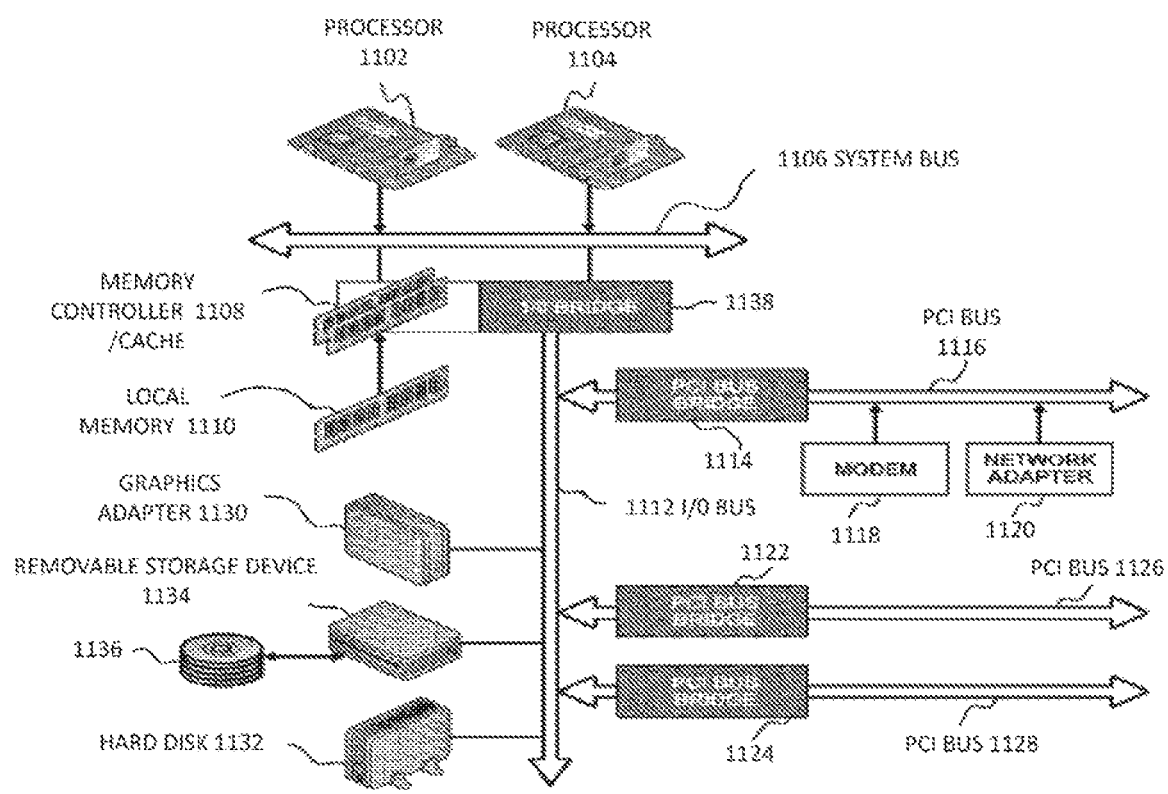
FIG. 11 is a block diagram of a data processing system on which the software application of FIG. 2 may run, in accordance with an embodiment of the present invention.

Referring to FIG. 11, a block diagram of a data processing system 1100 that may also be implemented as an electronic device or other computing device, in accordance with one embodiment of the present invention. The data processing system 1100 may be a symmetric multiprocessor (SMP) system including a plurality of processors 1102 and 1104 connected to system bus 1106. Alternatively, a single processor system may be employed. Also, connected to system bus 1106 is memory controller/cache 1108, which provides an interface to local memory 1110. An I/O bus bridge 1138 is connected to system bus 1106 and provides an interface to I/O bus 1112. The memory controller/cache 1108 and I/O bus bridge 1138 may be integrated as depicted. The processor 1102 or 1104 in conjunction with memory controller 1108 controls what data is stored in memory 1110. The processor 1102 and/or 1104 and memory controller 1108 can serve as a data counter for counting the rate of data flow to the memory 1110 or from the memory 1110 and can also count the total volume of data accessed to or from the memory 1110. The processor 1102 or 1104 can also work in conjunction with any other memory device or storage location.

Peripheral component interconnect (PCI) bus bridge 1114 connected to I/O bus 1112 provides an interface to PCI local bus 1116. A number of modems 1118, or wireless cards, may be connected to PCI bus 1116. Typical PCI bus implementations will support four PCI expansion slots or add-in connectors. PCI includes, but is not necessarily limited to. PCI-X and PCI Express components. Communications links to a network of computers, such as the Internet, may be provided through the modem 1118 and network adapter 1120 connected to PCI local bus 1116 through add-in boards.

Additional PCI bus bridges 1122 and 1124 provide interfaces for additional PCI buses 1126 and 1128, from which additional modems or network adapters may be supported. In this manner, the data processing system 1100 allows connections to a multiple network of computers. A graphics adapter 1130 and hard disk 1132 may also be connected to I/O bus 1112 as depicted, either directly or indirectly.

Those of ordinary skill in the art will appreciate that the hardware depicted in FIG. 11 may vary. For example, other peripheral devices, such as optical disk drives and the like, also may be used in addition to or in place of the hardware depicted. The depicted example is not meant to imply architectural limitations with respect to the present invention.

The processes explained in detail above can be embodied in a computer program. Computer programs (also called computer control logic) are stored in memory such as main memory 1110, removable storage drive 1134, removable media 1136, hard disk 1132, and signals. Such computer programs, when executed, enable the computer system to perform the features of the present invention as discussed herein. In particular, the computer programs, when executed, cause the processor 1102 and/or 1104 to perform one or more of the features described herein.

In this document, the terms "computer program medium," "computer usable medium," and "computer readable medium" are used to generally refer to media such as main memory 1110, removable storage drive 1134, removable media 1136, hard disk 1132, and signals. These computer program products are means for providing software to the computer system. The computer readable medium allows the computer system to read data, instructions, messages or message packets, and other computer readable information from the computer readable medium. The computer readable medium, for example, may include non-volatile memory, such as floppy, ROM, Flash memory. Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

Figure 12:
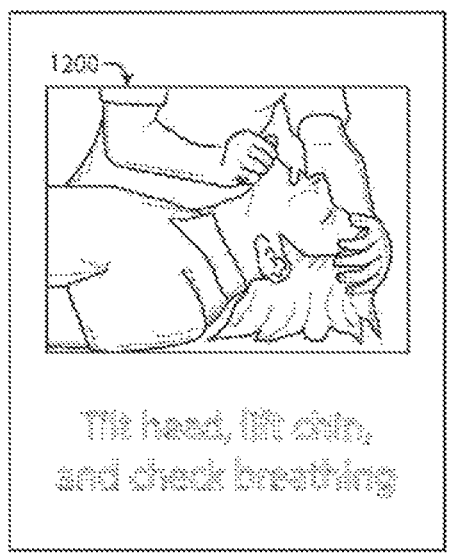
FIG. 12 is a screenshot of another exemplary software application implementing an inventive electronic flash card depicting an illustration of a first step in a medical procedure with a hidden narrative in accordance with an embodiment of the present invention.
Figure 13:
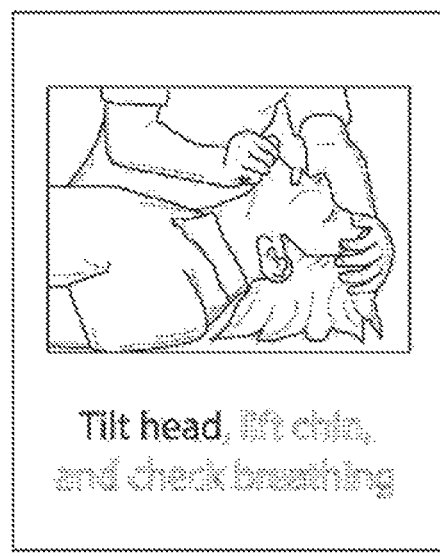
FIG. 13 is a screenshot of the exemplary software application of FIG. 12 depicting the illustration of the first step in the medical procedure with revealed words corresponding to a user's utterance/input in accordance with an embodiment of the present invention.
Figure 13:

Referring to FIGS. 12-17, another exemplary method of presenting an interactive story is illustrated in a series of screenshots. The exemplary method can be considered an interactive method of learning a medical procedure in accordance with an embodiment of the present invention. FIG. 12 shows a user interface displaying an illustration 1200 without a corresponding narrative. The illustration 1200 depicts a first step in a cardiopulmonary resuscitation (CPR) first aid medical procedure. It is noted that dotted line text appears below the illustration 1200, representing a hidden narrative that is not yet revealed to the user via the display. FIG. 13 illustrates a user's utterance 1300 of the words "tilt head," resulting in a determination that the user's utterance 1300 corresponds to words in the hidden text. As a result, the words "tilt head" are displayed on the display, while the unspoken words "lift chin, and check breathing" continue to remain hidden.

Figure 14:
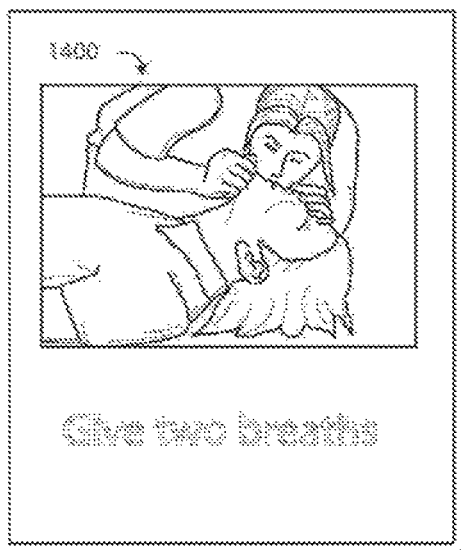
FIG. 14 is a screenshot of the exemplary software application of FIG. 12 depicting an illustration of a second step in the medical procedure with a hidden narrative in accordance with an embodiment of the present invention.
Figure 15:
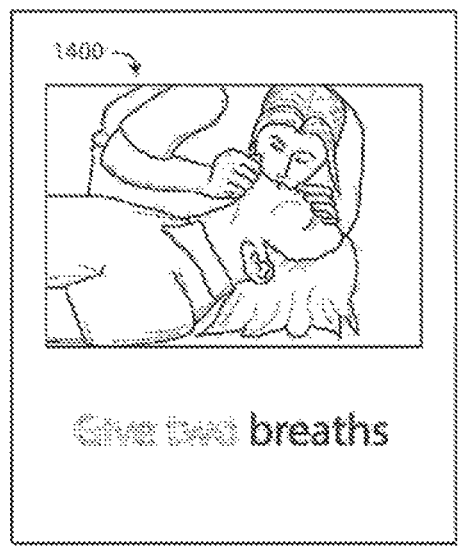
FIG. 15 is a screenshot of the exemplary software application of FIG. 12 depicting the illustration of the second step in the medical procedure with revealed words corresponding to a user's utterance/input in accordance with an embodiment of the present invention.

FIG. 14 shows a second illustration 1400 without a corresponding narrative. The second illustration 1400 depicts a second step in the CPR procedure. It is noted that dotted line text appears below the second illustration 1400, representing a hidden narrative that is not yet revealed to the user via the display. FIG. 15 illustrates the user's utterance

1500 of the word "breathe," resulting in a determination that the user's utterance 1500 corresponds to a word in the hidden text. In this embodiment, the root word of "breaths" is "breathe," therefore the hidden text BREATHS is displayed on the display, while the unspoken words "give two" remain hidden. In one embodiment, the second illustration 1400 is formed as an animated illustration where the person administering CPR is animated to illustrate giving two breaths so that the user is able to infer such information from the illustration 1400.

Figure 16:
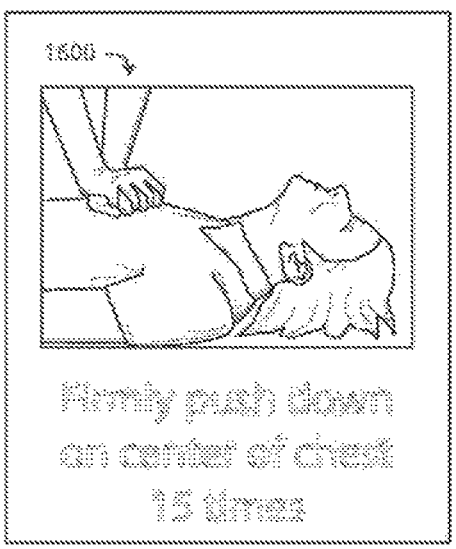
FIG. 16 is a screenshot of the exemplary software application of FIG. 12 depicting an illustration of a third step in the medical procedure with a hidden narrative in accordance with an embodiment of the present invention.
Figure 17:
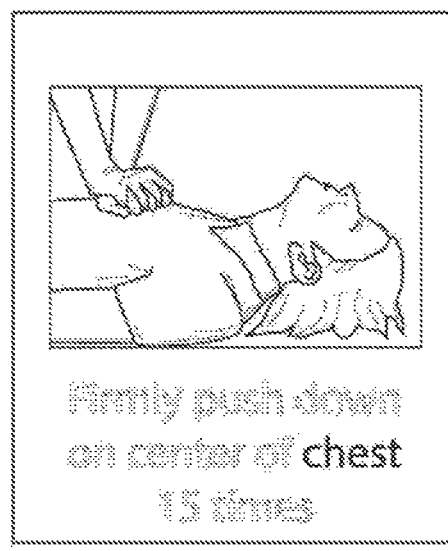
FIG. 17 is a screenshot of the exemplary software application of FIG. 12 depicting the illustration of the third step in the medical procedure with revealed words corresponding to a user's utterance/input in accordance with an embodiment of the present invention.

FIG. 16 shows a third illustration 1600 without a corresponding narrative. The third illustration 1600 depicts a third step in the CPR procedure. It is noted that dotted line text appears below the third illustration 1600, representing a hidden narrative that is not yet revealed to the user via the display. FIG. 17 illustrates the user's utterance 1700 of the word "chest," resulting in a determination that the user's utterance 1700 corresponds to words in the hidden text. As a result, the word "chest" is displayed to the user, while the words "firmly push down on center of and "15 times" remain hidden until the user is able to input/utter each of the words in the hidden narrative.

Figure 18:
FIG. 18 is a screenshot of another exemplary software application implementing another inventive electronic flash card depicting the illustration in the form of a textual visual representation with a hidden narrative in the form of a legal definition in accordance with an embodiment of the present invention.
Figure 19:
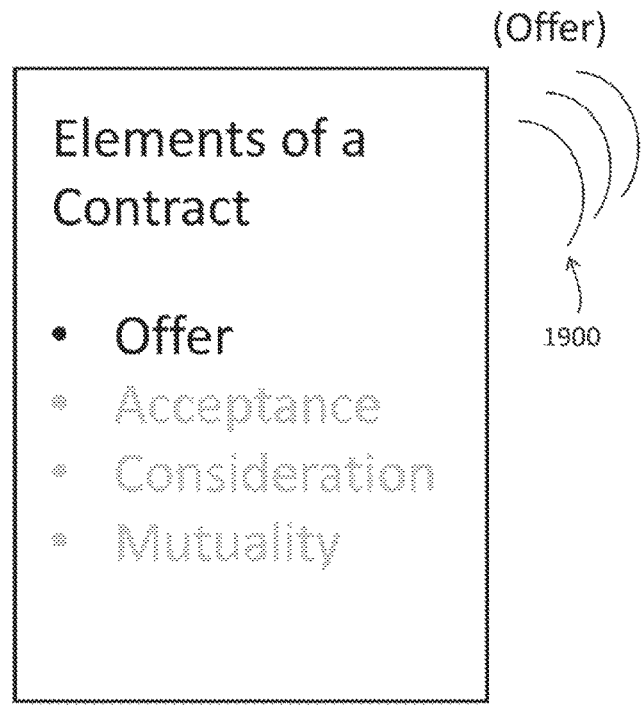
FIG. 19 is a screenshot of the exemplary software application of FIG. 18 depicting the illustration with a revealed word corresponding to the user's utterance/input in accordance with an embodiment of the present invention.

FIG. 18 shows an illustration 1800 without a corresponding narrative. The illustration 1800 is a textual visual representation identifying a legal concept, namely a contract. It is noted that dotted line text appears below the illustration 1800, representing a hidden narrative that is not yet revealed to the user via the display. FIG. 19 illustrates the user's utterance 1900 of the word "offer," resulting in a determination that the user's utterance 1900 corresponds to words in the hidden text. As a result, the word "offer" is displayed to the user, while the words "acceptance," "consideration," and "mutuality" remain hidden until the user is able to input/utter each of the words in the hidden narrative. In other embodiments, the illustration 1800 may be a mathematical formula, such as "10+10," with the hidden text being the answer to the mathematical formula, namely "20." In yet other embodiments, the illustration 1800 is a chemical formula, such as "H2O," with the hidden text being a description of the chemical formula, namely "two atoms of hydrogen and one atom of oxygen."

Figure 20:
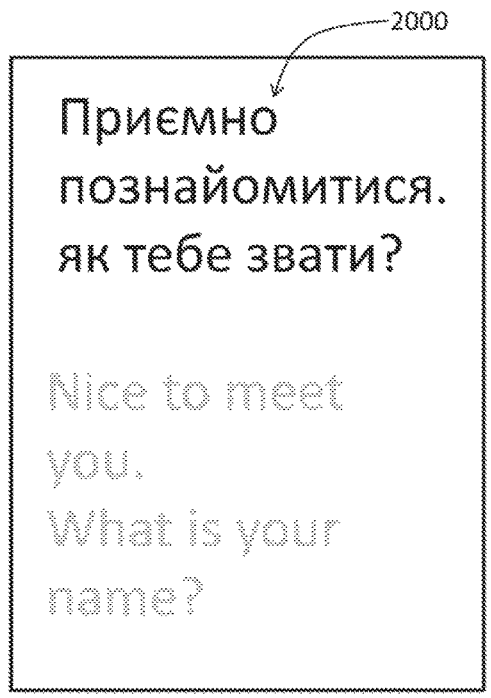
FIG. 20 is a screenshot of another exemplary software application implementing an inventive foreign language electronic flash card depicting the illustration in the form of a textual visual representation in a foreign language with a hidden narrative corresponding to a translation in a native language in accordance with an embodiment of the present invention.
Figure 21:
FIG. 21 is a screenshot of the exemplary software application of FIG. 20 depicting the illustration with revealed words corresponding to the user's utterance/input in accordance with an embodiment of the present invention.

FIG. 20 shows another exemplary illustration 2000 without a corresponding narrative. The illustration 2000 is a textual visual representation foreign language sentences. It is noted that dotted line text appears below the illustration 2000, representing a hidden narrative that is not yet revealed to the user via the display. FIG. 21 illustrates the user's utterance 2100 of the words "what is your name?" resulting in a determination that the user's utterance 2100 corresponds to words in the hidden text. As a result, the sentence "what is your name," which is an English translation of one of the foreign language sentences, is displayed to the user, while the sentence "nice to meet you" remains hidden until the user is able to input/utter each of the words in the hidden narrative. In one embodiment, in response to the hidden text being revealed, the software application also causes a computerized audio playback of the foreign language sentence so that the user may hear the proper pronunciation and intonations.

A novel and efficient method of presenting an interactive story has been disclosed that requires the user to participate in the storytelling process. Embodiments of the invention provide for displaying each illustration to the user with a hidden narrative that the user must reveal by making observations about the illustration and making inferences from the illustration. In some embodiments, a speech recognition module is used to determine whether audible utterances by the user correspond to one or more of the words in the hidden narrative. The inventive process develops attention skills by requiring users to pay very close attention to the details in the illustration and allows users to reveal the story through detailed observations of the illustration. The inventive process also develops writing skills, grammar, sentence building, and storytelling skills, while interactively engaging users in the story, as well as, provides an interactive method for foreign language learning and learning specific terminology and specific subject matter.

What is claimed is:

1. A computing device for presenting an interactive story, comprising:
 a processing device;
 a display device;
 a microphone configured to receive an audio signal representative of at least a portion of an utterance from a user;
 a memory device storing computer instructions, information associated with an illustration and a corresponding hidden narrative, the hidden narrative including a plurality of words, the processing device communicatively coupled to the display device, and the memory device, the processing device configured to execute the computer instructions, the computer instructions cause the processing device to:
 display a graphic user interface on the display device;
 display the illustration in the graphic user interface on the display device;
 identify a request for a clue and responsively provide a clue to the user, wherein the clue is a visual image clue enclosed in a speech bubble displayed proximate the illustration;
 detect, by the processing device, an utterance by the user via the microphone;
 receive, by the processing device, the audio signal, convert the audio signal to digital data, analyze the digital data, and identify a word corresponding to the digital data, if a word corresponding to the digital data is identified, the computer instructions cause the processing device to:
 determine if the identified word corresponding to the digital data matches one or more words included in the corresponding hidden narrative; and upon determining the identified word corresponding to the digital data matches one or more words included in the corresponding hidden narrative:
 display a text image of each matching word in a story display area, on the display device, positioned below the illustration, each text image of each matching word being displayed in a predefined order based on the corresponding hidden narrative, wherein the illustration is continuously displayed while the hidden narrative contains unmatched words.

2. The computing device of claim 1, wherein the processing device is programmed to:
 upon determining the identified word corresponding to the digital data matches one or more words included in the corresponding hidden narrative:
 activate a speaker of the computer system to initiate a computerized audio playback of sounds associated with each matching word.

3. The computing device of claim 1, wherein the corresponding hidden narrative includes a punctuation mark, the processing device programed to automatically display the punctuation mark when the text image associated with the matching word preceding or following the punctuation mark in the corresponding hidden narrative is displayed.

4. The computing device of claim 1, wherein the processing device is programmed to:
  detect a user selection of an object being displayed within the illustration;
  determine a word included in the corresponding hidden narrative associated with the object; and
  display a corresponding text image of the determined word in response to the user selection of the object.

5. The computing device of claim 1, wherein the processing device is programmed to:
  determine a word included in the corresponding hidden narrative to match the identified word corresponding to the digital data upon the determining the identified word corresponding to the digital data is a synonym for the matched word;
  display the text image of the matched word in the story display area; and
  display a visual image clue proximate the illustration.

6. The computing device of claim 1, wherein the processing device is programmed to:
  store information associated with an interactive story in the memory device, the interactive story including a plurality of virtual pages, each virtual page representing a scene from the interactive story, each scene illustrated in a specific corroborative way, so as to make every word of the pre-written hidden narrative ascertainable from the illustration on the corresponding virtual page, each scene including an associated illustration and corresponding hidden narrative; and
  display the virtual pages on the graphic user interface in a predefined sequence based on the interactive story to allow the user to participate in a storytelling process, wherein the associated illustration and corresponding hidden narrative of each virtual page of the interactive story are displayed to the user to prompt user's input for unveiling the corresponding hidden narrative.

7. Non-transitory computer-readable storage media, having computer-executable instructions embodied thereon for execution by a processing device of a computer system for presenting an interactive story, the computer system including a display device and a microphone, the microphone configured to receive an audio signal representative of at least a portion of an utterance from a user, the processing device communicatively coupled to the display device, the speech recognition module, and the memory device, wherein when executed by the processing device, the computer-executable instructions cause the processing device to:
  store, by the processing device, an illustration and a corresponding hidden narrative in a memory device, the hidden narrative including a plurality of words;
  display, by the processing device, a graphic user interface on the display device;
  display the illustration in the graphic user interface on the display device;
  identify, by the processing device, a request for a clue and responsively provide a clue to the user, wherein the clue is a visual image clue enclosed in a speech bubble displayed proximate the illustration;
  detect, by the processing device, an utterance by the user via a microphone and initiate a speech recognition module to identify a spoken word corresponding to the detected utterance;
  receive, by the processing device, the audio signal, convert the audio signal to digital data, analyze the digital data, and identify a word corresponding to the digital data, if a word corresponding to the digital data is identified, the computer instructions cause the processing device to:
  determine, by the processing device, if the identified word corresponding to the digital data matches one or more words included in the corresponding hidden narrative; and upon determining the identified word corresponding to the digital data matches one or more words included in the corresponding hidden narrative:
  display, by the processing device a text image of each matching word in a story display area positioned below the illustration, each text image of each matching word being displayed in a predefined order based on the corresponding hidden narrative, wherein the illustration is continuously displayed while the hidden narrative contains unmatched words.

8. Non-transitory computer-readable storage media according to claim 7, wherein the computer-executable instructions cause the processor to:
  upon determining the identified word corresponding to the digital data matches one or more words included in the corresponding hidden narrative:
  activate a speaker of the computer system to initiate a computerized audio playback of sounds associated with each matching word.

9. Non-transitory computer-readable storage media according to claim 7, wherein the computer-executable instructions cause the processor to:
  store the corresponding hidden narrative including a punctuation mark; and
  automatically display the punctuation mark when the text image associated with the matching word preceding or following the punctuation mark in the corresponding hidden narrative is displayed.

10. Non-transitory computer-readable storage media according to claim 7, wherein the computer-executable instructions cause the processor to:
  detect a user selection of an object being displayed within the illustration;
  determine a word included in the corresponding hidden narrative associated with the object; and
  display a corresponding text image of the determined word in response to the user selection of the object.

11. Non-transitory computer-readable storage media according to claim 7, wherein the computer-executable instructions cause the processor to:
  determine a word included in the corresponding hidden narrative to match the identified word corresponding to the digital data upon the determining the identified word corresponding to the digital data is a synonym for the matched word;
  display the text image of the matched word in the story display area; and
  display a visual image clue proximate the illustration.

12. Non-transitory computer-readable storage media according to claim 7, wherein the computer-executable instructions cause the processor to:
  store information associated with an interactive story in the memory device, the interactive story including a plurality of virtual pages, each virtual page representing a scene from the interactive story, each scene illustrated in a specific corroborative way, so as to make every word of the pre-written hidden narrative ascertainable from the illustration on the corresponding virtual page, each scene including an associated illustration and corresponding hidden narrative; and display the virtual pages on the graphic user interface in a predefined sequence based on the interactive story to allow the user to participate in a storytelling process, wherein the associated illustration and corresponding hidden narrative of each virtual page of the interactive story are displayed to the user to prompt user's input for unveiling the corresponding hidden narrative.

13. A computer based method for presenting an interactive story on a computing device, the computing device including a processing device, a display device, a microphone configured to receive an audio signal representative of at least a portion of an utterance from a user and a memory device and a processing device, the processing device communicatively coupled to the display device and the memory device, the method including the steps of
storing, by the processing device, an illustration and a corresponding hidden narrative in the memory device, the hidden narrative including a plurality of words;
displaying, by the processing device, a graphic user interface on the display device;
displaying the illustration in the graphic user interface on the display device;
identifying, by the processing device, a request for a clue and responsively providing a clue to the user, wherein the clue is a visual image clue enclosed in a speech bubble displayed proximate the illustration;
detecting, by the processing device, an utterance by the user via a microphone and initiate a speech recognition module to identify a spoken word corresponding to the detected utterance;
receiving, by the processing device, the audio signal, converting the audio signal to digital data, analyzing the digital data, and identifying a word corresponding to the digital data, if a word corresponding to the digital data is identified, performing the steps of:
determining, by the processing device, if the identified word corresponding to the digital data matches one or more words included in the corresponding hidden narrative; and upon determining the identified word corresponding to the digital data matches one or more words included in the corresponding hidden narrative, displaying, by the processing device a text image of each matching word in a story display area positioned below the illustration, each text image of each matching word being displayed in a predefined order based on the corresponding hidden narrative, wherein the illustration is continuously displayed while the hidden narrative contains unmatched words.

14. The method according to claim 13, the method including the step of upon determining the identified word corresponding to the digital data matches one or more words included in the corresponding hidden narrative, activating a speaker of the computer system to initiate a computerized audio playback of sounds associated with each matching word.

15. The method according to claim 13, including the steps of:
storing the corresponding hidden narrative including a punctuation mark; and
automatically displaying the punctuation mark when the text image associated with the matching word preceding or following the punctuation mark in the corresponding hidden narrative is displayed.

16. The method according to claim 13, including the steps of:
detecting a user selection of an object being displayed within the illustration;
determining a word included in the corresponding hidden narrative associated with the object; and
displaying a corresponding text image of the determined word in response to the user selection of the object.

17. The method according to claim 13, including the steps of:
determining a word included in the corresponding hidden narrative to match the identified word corresponding to the digital data upon the determining the identified word corresponding to the digital data is a synonym for the matched word;
displaying the text image of the matched word in the story display area; and
displaying a visual image clue proximate the illustration.

18. The method according to claim 13, including the steps of:
storing information associated with an interactive story in the memory device, the interactive story including a plurality of virtual pages, each virtual page representing a scene from the interactive story, each scene illustrated in a specific corroborative way, so as to make every word of the pre-written hidden narrative ascertainable from the illustration on the corresponding virtual page, each scene including an associated illustration and corresponding hidden narrative; and
displaying the virtual pages on the graphic user interface in a predefined sequence based on the interactive story to allow the user to participate in a storytelling process, wherein the associated illustration and corresponding hidden narrative of each virtual page of the interactive story are displayed to the user to prompt user's input for unveiling the corresponding hidden narrative.

* * * * *